United States Patent Office 2,704,764
Patented Mar. 22, 1955

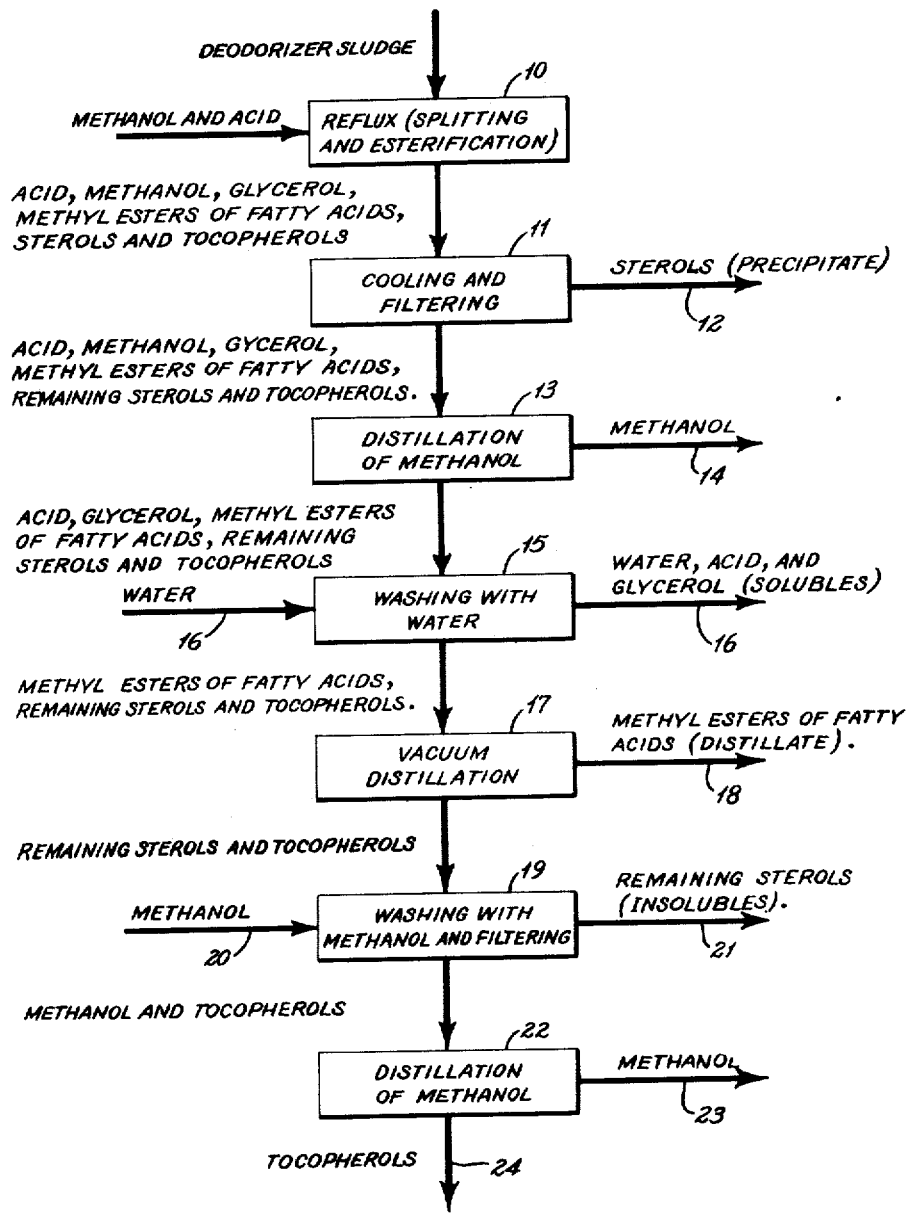

2,704,764

TREATMENT OF FATTY MATERIAL

Morris Mattikow and David Perlman, New York, N. Y., assignors to Benjamin Clayton, doing business under the fictitious name and style of Refining, Unincorporated, a sole proprietorship Application February 19, 1952, Serial No. 272,466

2 Claims. (Cl. 260—333)

This invention relates to the treatment of fatty material an more particularly to an improved process for recovering valuable products such as free sterols, tocopherols, and high grade fatty acids from deodorizer sludges and other waste products from the refining and deodorization of glyceride oils.

After alkali refining, glyceride oils are usually subjected to a high temperature steam distillation step under high vacuum to distill off volatile material which produce undesirable flavors and odors in the oil. This operation is usually referred to as deodorization. The materials causing such flavors and odors are largely unidentified, but in the deodorizing treatment substantial quantities of fatty materials including free fatty acids, glycerides of fatty acids and unsaponifiables such as sterols and tocopherols are volatilized or mechanically carried over with the steam and vapors in the distillation operation. The steam and volatilized materials are condensed and the resulting mixture of water and fatty material discharged into a settling tank. An upper layer of fatty material collects on the water and may be skimmed therefrom, this material being known in the art as deodorizer sludge. In general, such sludge is an oily or semi-solid material and, as indicated above, is made up largely of glycerides, free fatty acids and unsaponifiables. It ordinarily contains relatively large proportions of glycerides and free fatty acids but usually also contains substantial quantities of unsaponifiables such as various sterols and in some cases a substantial quantity of tocopherols. The unsaponifiables such as sterols and tocopherols are apparently present as complex compounds, as they are not readily separable from the sludge until the complexes are broken down.

A particularly suitable deodorizer sludge has recently become available and is understood to be the result of the deodorization of soya bean oil in a rapid process at higher temperatures and lower absolute pressures than those formerly employed in the art in order to produce a non-reverting soya bean oil. Such deodorizer sludge in general contains a higher percentage of sterols and tocopherols than are present in the usual deodorizer sludge. That is to say, this new deodorizer sludge or soya bean oil distillant on the average contains about 20% sterols, about 8% tocopherols, about 20% free fatty acids, the remainder being largely triglycerides.

In accordance with the present invention, deodorizer sludges are subjected to a splitting and esterification step by treating the sludges with a lower monohydric aliphatic alcohol and a strong acid under reflux conditions for sufficient time to split the complexes referred to above, as well as the triglycerides, the treating operation being carried out in a system in which the water content is as low as practicable. At the same time, the original free fatty acids and those liberated from the triglycerides or other compounds present in the sludge are esterified with the lower aliphatic alcohol. The sterols and tocopherols are liberated and appear in free form. Substantially all of the materials in the deodorizer sludge go into solution and, by cooling the resulting acidic alcoholic solution, a considerable portion of the sterols usually crystallizes out and may be removed by filtration or centrifugal separation. If no sterols percipitate, any sterols remaining in the solution can be recovered as described below. The excess alcohol may thereafter be distilled from the solution and recovered in concentrated form for return to the process. By washing the residual material with water, the excess acid and any glycerol which may be present, as well as any other water soluble materials, may be removed. This leaves a resulting material which contains the fatty acid esters of the lower aliphatic alcohol originally employed, the remaining sterols and the tocopherols. The fatty acid esters of the lower aliphatic alcohol may be vacuum distilled from this material, and this operation is relatively easy to carry out, as such esters distill at a substantially lower temperature than the fatty acids themselves. In this operation sterol esters of fatty acids do not form as is the case when it is attempted to distill fatty acids themselves from mixtures containing free fatty acids and sterols. The esters of fatty acids and lower monohydric aliphatic alcohols may be condensed and used or sold in the form in which they are recovered or may be reconverted into glycerol esters, such as mono-, di- or triglycerides or may be split to liberate high quality free fatty acids.

The residue from the vacuum distillation is made up largely of the remaining sterols and the tocopherols. The tocopherols are very soluble in lower aliphatic alcohols, particularly methanol, whereas the sterols are substantially insoluble in such alcohols when cool. By washing with a lower aliphatic alcohol at room temperature or below and filtering, the remaining sterols can be recovered as the insoluble portion, the filtrate being a solution of tocopherols. The lower aliphatic alcohol may be readily distilled from the tocopherols in concentrated form and returned to the process for reuse, leaving a concentrate of tocopherols.

Various other waste products from the refining or partial refining of glyceride oils, for example, the gums separated from the oil in a degumming operation or the soapstock from certain types of refining operations, after drying, may be subjected to substantially the same series of steps. The gums, for example, are substantially free of tocopherols, and the split products therefrom will also contain a substantial amount of other water soluble materials, such as choline and inositol compounds. These water soluble materials will be discharged from the process with the water in the water washing step and may be recovered from the resulting aqueous solution.

It is therefore an object of the present invention to provide an improved process for separately recovering unsaponifiables and high quality fatty acids or alcoholic esters thereof from deodorizer sludges and other waste products separated from glyceride oils in refining or partial refining processes and containing substantial amounts of unsaponifiables and fatty acids.

Another object of the invention is to provide a process for treating deodorizer sludges in which deodorizer sludges are subjected to a combined splitting and esterification step so as to enable free sterols and fatty acid esters of lower aliphatic alcohols to be easily recovered.

A further object of the invention is to provide a process of treating distillants from the high temperature deodorization of soya bean oil in order to recover sterols, tocopherols and high quality fatty acids or their esters with lower aliphatic alcohols.

Other objects and advantages of the invention will appear in the following description thereof, illustrated in the attached drawing which is a flow sheet of a preferred process in accordance with the present invention.

The process will first be described with respect to treating deodorizer sludge. Referring more particularly to the drawing, deodorizer sludge may be introduced into a splitting and esterification step 10 along with a lower monohydric aliphatic alcohol and a strong acid. The preferred alcohol is methanol, and the process will be particularly described with reference thereto. Substantially any strong acid which is non-oxidizing, i. e., does not have greater oxidizing properties than sulfuric acid, can be employed in the process.

The amount of alcohol employed is ordinarily about 8 times the weight of the deodorizer sludge but may range from 2.5 to 12 times the weight of the sludge, and the amount of acid will ordinarily range from between 5 and 50% of the weight of the deodorizer sludge, depending upon the acid employed. The amount of alcohol should provide a relatively large excess of alcohol over that required to esterify the fatty acids.

The splitting and esterification is ordinarily carried on at the boiling point of the alcohol at atmospheric pressure, and the vaporized alcohol condensed and returned to this step, i. e., the step is operated under reflux conditions. This step may, however, be carried out under superatmospheric pressure and at higher temperatures. Thus temperatures between approximately 64° C. and 150° C. are suitable. The time required for the splitting and esterification step will vary with the nature and concentration of the acid and the temperature and is continued until the reaction mass is substantially entirely homogeneous or only very small amounts of an oily material remain. The usual time is between three to twelve hours, although additional time up to 24 hours may be required when appreciable amounts of water are present. That is to say, the presence of water during the splitting and esterification step is undesirable and for best operation the amount of water should be maintained as low as possible, i. e., below approximately 2.5% of the reaction mixture. Greater amounts of water up to about 6.5% can be tolerated, but the time of treatment under reflux conditions will ordinarily be substantially doubled.

The reaction products may be discharged from the splitting and esterification step to a cooling and filtration step 11. These reaction products are predominantly methyl esters of fatty acid along with glycerol, sterols, tocopherols, the acid employed, and excess methanol.

By cooling the reaction products to a temperature below about 20° C., i. e., between 0° and 20° C., a large proportion of the liberated sterols will ordinarily precipitate and may be separated from the remaining solution by filtering or other separation step effective for removing solids from liquids. The sterols may be discharged from the process as indicated by the arrow 12. These sterols may be purified if desired by recrystallization from methol or ethyl alcohol.

The liquid material discharged from the cooling and filtering step 11 is predominantly a methanol solution of methyl esters of fatty acids contained in solution, glycerol, acid, tocopherols and the remaining sterols. This liquid material may be delivered into a distillation step 13 in which the excess methanol is distilled from the solution. The methanol may be condensed and discharged as indicated by the arrow 14. The methanol is in concentrated form and may be returned to the process for employment in the splitting and esterification step 10. This distillation is ordinarily carried on at atmospheric pressure.

The residue from the distillation step 13 is predominantly methyl esters of fatty acids containing in solution any glycerol, acid, tocopherol and the remaining sterols. This material may be delivered into a water washing step 15, water being added as indicated by the arrow 16. The acid and glycerol are soluble in the water. A water phase containing these materials is readily separated from a fatty phase and discharged from the process as indicated by the arrow 16. The washed material discharged from the washing step 15 is predominantly methyl esters of fatty acids and contains the tocopherols and remaining sterols. This material may be subjected to vacuum distillation in a distillation step 17. The methyl esters of the fatty acids distill readily from the sterols and tocopherols and may be discharged in vapor form and condensed to form a distillant which is substantially pure methyl esters of fatty acids. This distillant may be discharged from the process as indicated by the arrow 18.

The still residue contains the remaining sterols and tocopherols and may be delivered into a methanol washing step 19 to which methanol is added is indicated by the arrow 20. The tocopherols are very soluble in methanol at room temperature or below, i. e., 0 to 20° C., while the sterols remain insoluble and may be separated as a solid material from the methanol solution by filtering or any other effective method of separating a solid from a liquid. The sterols may be discharged from the process as indicated by the arrow 21. The methanol solution of tocopherols may be delivered into a distillation step 22 in which the methanol may be readily distilled from the tocopherols and discharged as indicated by the arrow 23. This distillation may be at atmospheric pressure and the methanol may be condensed. This methanol is also in concentrated form and may be returned to the splitting and esterification step 10 for reuse in the process. The residue in the still is a tocopherol concentrate and may be discharged from the process as indicated by the arrow 24.

It will be apparent that the sterols discharged from the process from the step 11 and the step 19 may be combined or that they may be sold or utilized separately. The sterols will ordinarily be a mixture of various sterols but are substantially free of impurities and are in free form, i. e., not esterified with fatty acids. They constitute a valuable product for various uses, including the synthesizing of various hormones.

The methyl esters of fatty acids are light in color and substantially pure. They may be sold or employed without further purification or may be further purified by redistillation. They may be hydrogenated to form saturated methyl esters which also have various uses. Furthermore, they may be easily converted into high quality mono- or di-glycerides or even triglycerides by heating with the calculated proportions of glycerol in the presence of a catalyst such as sodium methoxide in vacuo. If fatty acids are desired, the esters may be hydrolyzed to high-grade fatty acids by heating with aqueous acid solutions and the fatty acids separated from the aqueous solution as a water-insoluble fatty phase.

Although methanol is the preferred lower aliphatic alcohol as it has the lowest solublity for sterols of any of such alcohols and also produces fatty acid esters having the lowest boiling point, it is, however, entirely possible to employ ethyl alcohol or even normal or isopropyl alcohol, i. e., aliphatic monohydric alcohols having no more than three carbon atoms.

As stated above, substantially any strong acid which does not have oxidizing properities greater than that of sulfuric acid may be employed. The preferred acid is sulfuric acid, but other acids which may be employed are hydrochloric, either as anhydrous HCl or in concentrated form, benzene sulfonic acid, aromatic or aryl sulfonic acids, aryl sulfuric acids, trihaloacetic acids, such as trichloracetic and trifluoracetic acids, other alpha polyhalo carboxylic acids, or even strongly acidic cationic exchange resins of the sulfonic acid type. The amount of acid will vary, depending upon the nature of the acid employed, but will ordinarily be between 5 and 100% by weight of the deodorizer sludge. As stated above, the time required for the splitting and esterification step will vary with the nature and concentration of the acid. As specific examples of the splitting and esterification step and the cooling and filtering step as applied to the deodorizer sludge, the following are given:

*Example 1*

25.0 parts by weight of soya oil distillate and a solution of 12.9 parts by weight of concentrated $H_2SO_4$ in 397 parts by weight of methanol were refluxed for 7½ hours. The resulting mixture was homogeneous, that is to say, no oil phase was left. The mixture was cooled to 10° C. The precipitate of sterol crystals was filtered and washed three times with approximately 16 parts by weight of cold methanol and air-dried. The yield of sterol was 4.8 parts by weight which is 19.2% of the total soya oil distillate. The melting point of the sterol recrystallized from methanol was 136–139° C. Test for sterol esters was negative.

*Example 2*

A reaction mixture of 25.0 parts by weight of soya oil distillate, 3.68 parts by weight of concentrated $H_2SO_4$ and 238 parts by weight of methanol was refluxed for 11 hours. The homogeneous liquid was cooled to 10° C. and the sterols recovered as in Example 1. The yield was 17.8% of sterols.

*Example 3*

A reaction mixture of 25.0 parts by weight of soya oil distillate, 5.84 parts by weight of concentrated HCl and 318 parts by weight of methanol, was refluxed for 14 hours. The homogeneous liquid mass was cooled to 5° C., and the sterols filtered and recovered as in Example 1. Yield 19.6% of sterols.

*Example 4*

A reaction mixture of 10.0 parts by weight of soya oil distillate, 2 parts by weight of benzene sulfonic acid and 99.3 parts by weight of methanol was refluxed for 6 hours, cooled and the sterols filtered as in Example 1. Yield of sterols was 18.2%.

*Example 5*

A reaction mixture of 20.0 parts by weight of soya oil distillate, 9.20 parts by weight of concentrated sulfuric acid, and 161 parts by weight of 95% ethyl alcohol was refluxed for 11 hours, cooled and the sterols filtered as in Example 1. Yield of sterols was 16.0%.

The methanol solution of methanol esters of fatty acids, acid, glycerol, tocopherol and remaining sterols from each of the examples above given may be treated as described above to recover the fatty acid esters, the remaining sterols and tocopherols. Substantially all of the fatty acid esters are recovered in the vacuum distillation step 17 and substantially all of the remaining sterols are recovered in the washing step 19, leaving the tocopherol for recovery in the distillation step 22.

Although the water washing step 15 to remove soluble materials is preferably carried out prior to the vacuum distillation step 17, it is entirely possible to omit this step at the point indicated and provide a similar water-washing step after the vacuum distillation step. In any case, substantially pure esters of fatty acids are recovered from the vacuum distillation step 17. In fact, the water-washing step may even be deferred until after the methanol washing step 19 and methanol distillation step 22 have been carried out. That is to say, the water soluble materials may be carried down into the tocopherol concentrate and removed by a water-washing step after the methanol distillation step 22. It is of course undesirable to wash with water when methanol is present in the mixture being treated, since to do so would be to dilute the methanol recovered in a methanol distillation step, but aside from that factor the water washing step could be carried out between the methanol washing step 19 and methanol distillation step 22. In any case, the acid and glycerol are separated from the other products by the water washing step.

In our copending application Serial No. 120,602 filed October 10, 1949, now Patent No. 2,585,954, we have disclosed a process of treating the gums from the partial refining or degumming of glyceride oils. This process involves the subjection of the dried gums, either before or after removal of contained glyceride oil, to a splitting and esterification step similar to the step 10 of the present process. It also includes a cooling and filtering step similar to the step 11 of the present process for recovering sterols. The further method of treating the liquid material discharged from the cooling and filtering step was to add water to thereby produce a fatty phase containing the fatty acid esters of the alcohol employed and an aqueous phase containing the alcohol and any other water soluble materials which are present. In the case of gums the materials going into solution in the aqueous phase would be acid, the lower aliphatic alcohol employed, glycerol and substantial amounts of choline and inositol compounds. Instead of adding water immediately after the cooling and filtration step, the gums contemplated in Patent No. 2,585,954 may be subjected to the process of the present invention. That is to say, the alcohol solution from the cooling and filtering step 11 may be subjected to treatment in the remaining steps of the present process. Thus the alcohol may be first substantially completely distilled therefrom in a distillation step 13. In the water washing step 15, the aqueous solution discharged as shown by the arrow 16 will not only contain acid and glycerol but will also contain substantial amounts of inositol compounds and choline, which may be recovered therefrom by suitable recovery steps. The fatty acid esters may be distilled from the remaining material in a distillation step 17. In general, the gums from even the degumming of soya bean oil are very low in tocopherols so that the residue from the vacuum distillation step 17 will be largely free sterols. These may be purified by washing with alcohol as indicated in the step 19 and the impurities which remain in solution in the alcohol discharged from the process after distillation of the alcohol therefrom in a step similar to the step 22.

Other waste products from the refining of glyceride oils may also be subjected to the process of the present invention. For example, the soapstock from the refining of glyceride oils with volatile bases, such as ammonia or volatile amines, are very similar to the gums contemplated in Patent No. 2,585,954, the main difference being that they are somewhat higher in free fatty acid content. This soapstock, after distillation of the volatile amines and drying, may be handled in the same manner as the gums discussed above. Even the soapstock from the alkali refining of the glyceride oils may be employed as a starting material if dried prior to introduction into the present process. In this case a relatively large amount of acid will be required to first neutralize the alkali in the soapstock and decompose the fatty acid soaps present. An excess of acid, to serve as a catalyst in the splitting and esterification step, over that required to neutralize the alkali and decompose the fatty acid soaps must be employed. This excess will be an amount substantially the same as that added to the splitting and esterification step described in detail above. The process as applied to such soapstock is substantially the same as that discussed above with respect to the gums from a degumming operation, but in such case the water soluble material separated from the process in the water washing step 15 or similar step may also contain a relatively large amount of inorganic salts of the alkali employed in the refining operation and the acid employed in the splitting and esterification step of the present invention. Also, in treating soapstocks some inorganic material may remain undissolved in the splitting and esterification step. In this case, the step is continued for sufficient time to dissolve substantially all of the fatty material, and the products may be filtered hot and the residue discarded before cooling to precipitate sterols. As to the cooling and sterol precipitating step 11, it is preferred to recover a portion of the sterols at this stage in the process but with some of the starting materials contemplated the sterol concentration may not be sufficiently great to produce a substantial precipitate, in which case this step may be omitted. Even in cases where a substantial recovery of sterols can be obtained in this step, it is entirely possible to omit this step and recover all of the sterols in step 19.

As another modification of the process, the vacuum distillation step 17 for recovery of the alcoholic esters of fatty acids may in the first instance be discontinued when the sterol content of the mixture therein has been increased in the residue to, for example, 10 to 30%. By adding methanol and cooling, a precipitate of sterols can be obtained at this point in the process. The methanol can then be removed by distillation and the residue of this distillation again vacuum distilled to recover additional alcoholic esters of fatty acids and again increase the sterol content of the residue in the still.

In general, the process is particularly applicable to the treatment of relatively high grade fatty materials, i. e., relatively light in color fatty materials, such as deodorizer sludge, and gums and soapstock from the lighter colored glyceride oils; lower grade fatty materials, such as black grease and cottonseed soapstock being more advantageously treated by the process described and claimed in our copending application Serial No. 272,465, filed February 19, 1952.

It should be apparent from the above that the present invention is applicable to substantially any waste product from the refining of glyceride oils which contains substantial amounts of sterols either in free or combined form and substantial amounts of fatty acids either in free or combined form. In any case, high purity free sterols in high yields are obtained without distillation of free fatty acids at high temperatures. No esterification of sterols with fatty acids is obtained as is the case when it is attempted to distill free fatty acids from mixtures of free fatty acids and sterols. Also the sterols may be easily separated from any other unsaponifiables present, such as tocopherols and inhibitols. The fatty acids are recovered as high quality esters thereof with lower aliphatic alcohols and, as discussed above, may be readily converted to high-grade free fatty acids or other valuable products, such as mono- and di-glycerides.

This application is a continuation-in-part of our copending application Serial No. 120,602, filed October 10, 1949, now Patent No. 2,585,954, granted February 19, 1952.

We claim:

1. In the process of recovering valuable materials from deodorizer sludge containing substantial amounts of unsaponifiables including sterols and tocopherol as well as fatty acids, with at least a portion of said unsaponifiables and fatty acids being in combined form, wherein said sludge is treated with a strong, non-oxidizing acid in a lower monohydric aliphatic alcohol containing not more than three carbon atoms at a temperature between approximately 64° C. and 150° C. for sufficient time to liberate any combined fatty acids and unsaponifiables in said sludge and to esterify the said fatty acids in the resulting material with said alcohol, the amount of said alcohol being sufficient to esterify said fatty acids and dissolve substantially all of the fatty products in the resulting mixture at said temperature, the free lower alcohol is distilled from the mixture, the remaining water soluble materials are removed from the mixture by washing with water, and the lower aliphatic alcohol esters are vacuum distilled from the water washed material to recover said esters in substantially pure form, the steps of cooling the mixture resulting from treatment of said sludge with said acid in said lower aliphatic alcohol and removing the sterols which precipitate on cooling prior to vacuum distillation of said lower aliphatic alcohol esters; and, subsequent to said vacuum distillation, washing the remaining material with an amount of a lower aliphatic alcohol at a temperature of approximately 0 to 20° C. sufficient to dissolve said tocopherol but precipitate additional sterols, separating the precipitated additional sterols from the resulting alcoholic solution, and distilling the alcohol from the remaining alcoholic solution to recover a tocopherol concentrate.

2. The process as defined in claim 1 in which the deodorizer sludge is that resulting from the high temperature deodorization of soya bean oil.

References Cited in the file of this patent

UNITED STATES PATENTS

| | | |
|---|---|---|
| 1,701,703 | Starrels | Feb. 12, 1929 |
| 2,223,398 | Bennett | Dec. 3, 1940 |
| 2,432,181 | Trent | Dec. 9, 1947 |
| 2,516,834 | Bohm | Aug. 1, 1950 |
| 2,585,954 | Mattikow et al. | Feb. 19, 1952 |

FOREIGN PATENTS

| | | |
|---|---|---|
| 612,667 | Great Britain | Nov. 16, 1948 |

OTHER REFERENCES

Ser. No. 414,980, Grandel et al. (A. P. C.), published May 11, 1943.

Dedication 2,704,764.—*Morris Mattikow* and *David Perlman*, New York, N.Y. TREATMENT OF FATTY MATERIAL. Patent dated Mar. 22, 1955. Dedication filed June 30, 1964, by the assignee, *Benjamin Clayton, doing business as Refining, Unincorporated.*

Hereby dedicates to the public the terminal part of the term of said patent effective December 31, 1963.

[*Official Gazette September 29, 1964.*]